US009258397B2

(12) United States Patent
Lee et al.

(10) Patent No.: US 9,258,397 B2
(45) Date of Patent: Feb. 9, 2016

(54) PROTECTIVE CASE WITH SPEAKER SOUND AMPLIFICATION PATH

(75) Inventors: Byoung-Hee Lee, Seoul (KR); Ki-Won Kim, Gyeonggi-do (KR); Sun-Young Lee, Chungcheongbuk-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 309 days.

(21) Appl. No.: 13/591,835

(22) Filed: Aug. 22, 2012

(65) Prior Publication Data

US 2013/0070948 A1   Mar. 21, 2013

(30) Foreign Application Priority Data

Sep. 20, 2011   (KR) .......................... 10-2011-0094447

(51) Int. Cl.
*H04M 1/03*     (2006.01)
*H04M 1/04*     (2006.01)

(52) U.S. Cl.
CPC ................ *H04M 1/035* (2013.01); *H04M 1/04* (2013.01)

(58) Field of Classification Search
CPC ..... H04M 1/035; H04M 1/04; H04M 1/0202; H04R 2499/11; H04R 1/2849; H04R 1/2896; H04R 1/02; G10K 11/08; H05K 5/03
USPC ........... 381/87, 334, 337, 339, 340, 345, 386, 381/388; 181/152, 177, 195, 182; 379/451, 379/454, 433.02, 433.11; 455/575.8, 350
See application file for complete search history.

(56) References Cited

U.S. PATENT DOCUMENTS

| 5,963,640 | A  | * | 10/1999 | Rabe ............... H04M 1/0214 379/433.02 |
| 8,256,568 | B2 | * | 9/2012 | Lin ................................. 181/179 |
| 8,522,917 | B1 | * | 9/2013 | Oh et al. ......................... 181/192 |
| 8,528,690 | B1 | * | 9/2013 | Wu .................................. 181/179 |
| 2002/0009195 | A1 | * | 1/2002 | Schon ............................ 379/454 |
| 2007/0223745 | A1 |   | 9/2007 | Feng et al. |
| 2008/0268793 | A1 |   | 10/2008 | Nelson et al. |
| 2009/0184145 | A1 |   | 7/2009 | Yeh |
| 2012/0027237 | A1 | * | 2/2012 | Lin ................................. 381/340 |
| 2012/0294469 | A1 | * | 11/2012 | Weaver, III ................... 381/334 |
| 2013/0045782 | A1 | * | 2/2013 | Simmer ...................... 455/575.8 |
| 2013/0048413 | A1 | * | 2/2013 | Patzer .......................... H04M 1/04 181/199 |
| 2014/0174846 | A1 | * | 6/2014 | Molinaro ...................... 181/177 |

FOREIGN PATENT DOCUMENTS

EP      1 916 869 A2      4/2008
KR    20-2000-0009700 U   6/2000

(Continued)

*Primary Examiner* — Vivian Chin
*Assistant Examiner* — Jason R Kurr
(74) *Attorney, Agent, or Firm* — Cha & Reiter, LLC

(57) ABSTRACT

A protective case having a speaker sound amplification path and an electronic device including at least one speaker device are disclosed. The protective case includes a base surface placed adjacent to at least one side of the electronic device to protect the electronic device, at least one speaker sound amplification path formed in the base surface and having a specific depth including a first location corresponding to a speaker hole of the electronic device to output a speaker sound of the speaker device, and a speaker sound output hole at a second location extended from the speaker sound amplification path and formed to an outer side of the protective case in an open manner, wherein the speaker sound output from the speaker hole is amplified within the speaker sound amplification path and is then output through the speaker sound output hole.

19 Claims, 21 Drawing Sheets

(56) References Cited

FOREIGN PATENT DOCUMENTS

| KR | 10-2005-0053427 A | 6/2005 |
| KR | 20-2011-0007308 U | 7/2011 |
| TW | M 394 026 U1 | 12/2010 |
| WO | 2005/015682 A1 | 2/2005 |

* cited by examiner

PROTECTIVE CASE WITH SPEAKER SOUND AMPLIFICATION PATH

CLAIM OF PRIORITY

This application claims the benefit from a Korean patent application filed in the Korean Intellectual Property Office on Sep. 20, 2011 and assigned Serial No. 10-2011-0094447, the disclosure of which is hereby incorporated by reference in its entirety.

BACKGROUND OF THE INVENTION

1. Field of the Invention

The present invention relates to a protective case for an electronic device.

2. Description of the Related Art

Among electronic devices, portable terminals have recently experienced rapid development. The portable terminals tend to employ various additional functions in addition to a basic telephony function. To cope with users' demands, portable terminals having various functions have been launched.

Such a portable terminal has been evolved from initial-stage terminals having various opening forms, for example, a bar-type terminal, a folder-type terminal, a slide-type terminal, etc., to a smart phone which has a typical bar-type form and has a touch input/output pattern with a large screen placed to occupy a greater part of a front side of the terminal.

Such a smart phone includes a basic telephony function and a digital camera module, and in addition thereto, is capable of performing communication through Wireless Fidelity (Wi-Fi) or $3^{rd}$ Generation (3G), $4^{th}$ Generation (4G) network, wireless communication with neighboring devices through a Bluetooth module, and communication using Near Field Communication (NFC). In addition, a variety of location information services can be accessed using the smart phone by simultaneously employing a Global Positioning System (GPS) module, a terrestrial magnetism sensor, or an ambient light sensor, etc. The usage environment of the smart phone can thus be automatically controlled using various communication and location functions.

Meanwhile, the smart phone allows a user to capture a High Definition (HD) video by using a digital camera, to listen to the music by using an MPEG Audio Layer-3 (MP3) file, and to enjoy a video file by storing the file into an internal memory without an additional encoding process.

Such functions require a speaker device for allowing the user to listen music or sounds. The user can independently listen to a speaker sound by inserting an ear-jack to an ear-jack hole disposed in a particular place of a portable terminal and then by placing an earphone device to an ear of the user. However, typically at least one speaker device is installed in addition to an ear piece for a call so that many people around the user can listen the speaker sound, and it is implemented such that the speaker sound is output through a speaker hole formed in a case frame of the terminal.

For enabling multimedia functions of the smart phone, the speaker device has an important role. It is difficult to output a high-power sound to a more compact-sized speaker device, and there is a challenge to provide two or more stereo or surround speaker sounds by using one speaker device.

However, according to a recent trend of providing various functions at the same time in order to make the device slimmer, lighter, thinner, and simpler, in order to cope with customers' demands, the speaker device applied to the portable terminal must be limited in its size and output. Such limitations of the speaker device cause problems of performance deterioration of the terminal.

Therefore, in order to solve a low-power problem of the speaker device, an additional speaker sound amplification device (so-called a 'speaker dock') can be used. When the portable terminal is placed to an upper portion of the speaker sound amplification device, a speaker sound is output to an outside of the device.

However, since the additional speaker sound amplification device is relatively expensive, it is difficult to purchase the device. Further, since the additional speaker sound amplification device is large enough to place the portable terminal therein, portability is low, and there is a high risk of loss since the user has to carry the speaker sound amplification device in addition to the portable terminal.

Additionally, consumers who purchase a high-priced smart phone use an additional protective case by placing the case to the smart phone to protect an exterior of the smart phone and to maintain a best grip feel. The protective case for the terminal is made of a material such as rubber, silicon, urethane, etc., that can be attached to one side of the terminal or that can entirely cover the terminal except for a display device.

However, the protective case of the portable terminal typically has just the single function of protecting or beatifying the exterior of the portable terminal.

SUMMARY OF THE INVENTION

An aspect of the present invention is to address at least the above-mentioned problems and/or disadvantages and provides additional advantages, by providing a protective case having a speaker sound amplification path implemented such that a speaker sound output from an electronic device is provided to a user by amplifying the speaker sound while beatifying an exterior of the electronic device. The speaker sound amplification path in accordance with this invention may be implemented as a speaker horn. The speaker horn may have the form which provides a gradual increase of the cross sectional area of the horn, thereby allowing the sound waves emanating from a speaker to gradually decompress and increase in displacement until they reach the output of the sound amplification path where they are of a low pressure but large displacement.

Another aspect of the present invention is to provide a protective case which can always be used to hold or cover an electronic device to avoid the inconvenience of carrying the cover and the device separately and which has a speaker sound amplification path implemented to prevent a risk of loss.

Another aspect of the present invention is to provide a protective case having a speaker sound amplification path implemented to avoid adding an additional high cost for preparation of an additional device for speaker sound amplification.

In accordance with an aspect of the present invention, a protective case for an electronic device including at least one speaker device is provided. The protective case includes a base surface placed to at least one side of the electronic device to protect the electronic device, at least one speaker sound amplification path formed in the base surface and having a specific depth including a location corresponding to a speaker hole of the electronic device to output a speaker sound of the speaker device, and a speaker sound output hole extended from the speaker sound amplification path and formed to an outer side of the protective case in an open manner, wherein the speaker sound which is outputted from the speaker hole is amplified within the speaker sound amplification path and is then outputted through the speaker sound output hole.

In the aforementioned aspect of the present invention, the speaker sound amplification path may be formed to have a surface lower than the base surface of the protective case, and its cross-area may be gradually widened in a direction of the speaker sound output hole at a location of the speaker hole, so that the speaker sound amplification path becomes a speaker sound amplification space by allowing the electronic device and the base surface to contact with each other.

In addition, at least one spacer extended up to a height of the base surface may protrude in the speaker sound amplification path, so that the speaker amplification path is prevented from changing while the electronic device is used.

In addition, a sealing member may be placed to the base surface such that the sealing member is higher than the base surface along a border portion of the speaker sound amplification path, so that the speaker sound amplification path is completely sealed by the electronic device and thus an amplified speaker sound is output only through the speaker sound output hole.

In addition, the sealing member may be insert-molded along the border portion of the speaker sound amplification path of the base surface, and the sealing member may be formed with a more flexible material than the protective case.

In addition, the sealing member may be an adhesive member attached along the border portion of the speaker sound amplification path of the base surface, and the adhesive member may be formed with any one of poron, rubber, and silicon.

In addition, a recess having a specific depth may be formed along the border portion of the speaker sound amplification path of the base surface, and the sealing member may be formed with a silicon or rubber material installed such that when the sealing member is completely inserted to the recess and a portion thereof protrudes from the base surface.

In addition, when the protective case is formed with a flexible material such as rubber and silicon, the sealing member may be formed in an integral manner with the protective case and a portion thereof protrudes from the base surface.

In addition, the speaker sound amplification path may be attached to the base surface with a specific height, and may be implemented with a speaker sound amplification path member in which an open space for the speaker sound amplification path is formed in the middle of the speaker sound amplification path member. The sealing member may be further placed to be higher than a surface of the speaker sound amplification path member along a boundary of the open space of the speaker sound amplification path member.

In addition, the speaker sound amplification path may be formed inside the base surface. A through-hole may be formed in a portion corresponding to the speaker hole of the base surface up to the speaker sound amplification path. The speaker sound output from the speaker hole may be amplified within the speaker sound amplification path through the through-hole and is output through the speaker sound output hole.

In addition, the protective case may further form a lateral portion having a specific height along a boundary of the base surface of a lateral side to provide protection for the electronic device.

In addition, the speaker device may output the speaker sound through a speaker hole formed in the lateral side of the electronic device. The speaker sound amplification path may extend up to the lateral portion of the protective case corresponding to the speaker hole.

In addition, at least two of the speaker device and the speaker hole may be spaced apart from each other by a specific interval in the electronic device. The speaker sound amplification path may be formed individually to a position corresponding to the speaker hole. The respective speaker sound amplification paths may be formed to have the same size to each other.

In addition, the protective case may be formed with at least one of materials of rubber, silicon, urethane, and synthetic resin.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the protective case with speaker sound amplification path according to the present invention will become more apparent from the following detailed description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
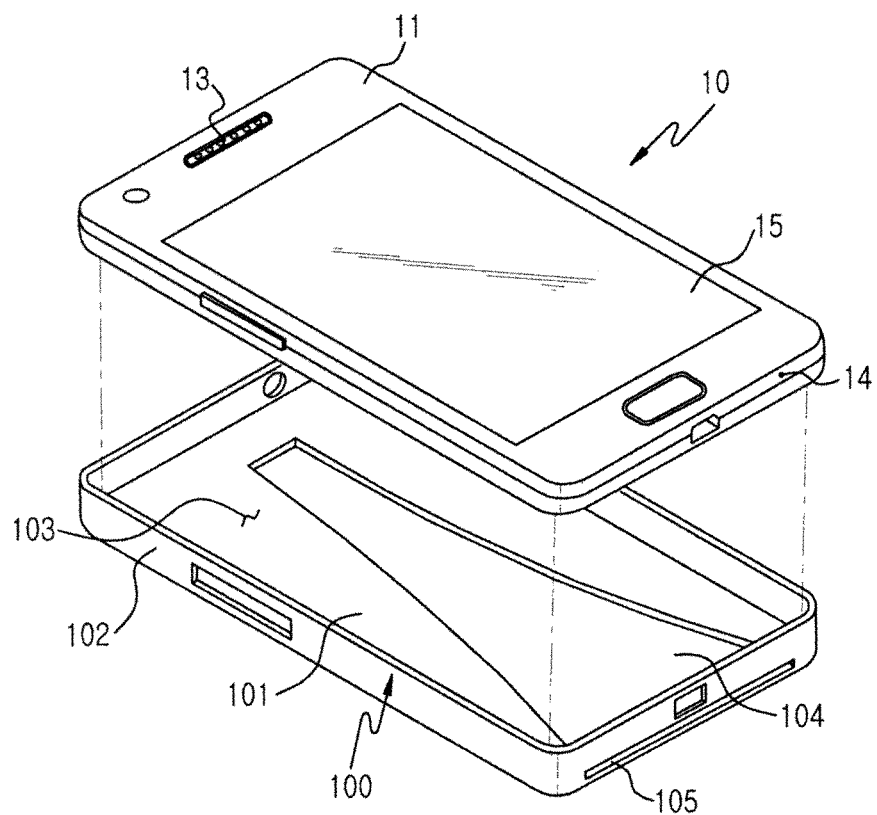
FIG. 1 is a top combined perspective view illustrating a portable terminal such as an electronic device is placed into a protective case according to a $1^{st}$ exemplary embodiment of the present invention.
Figure 2:
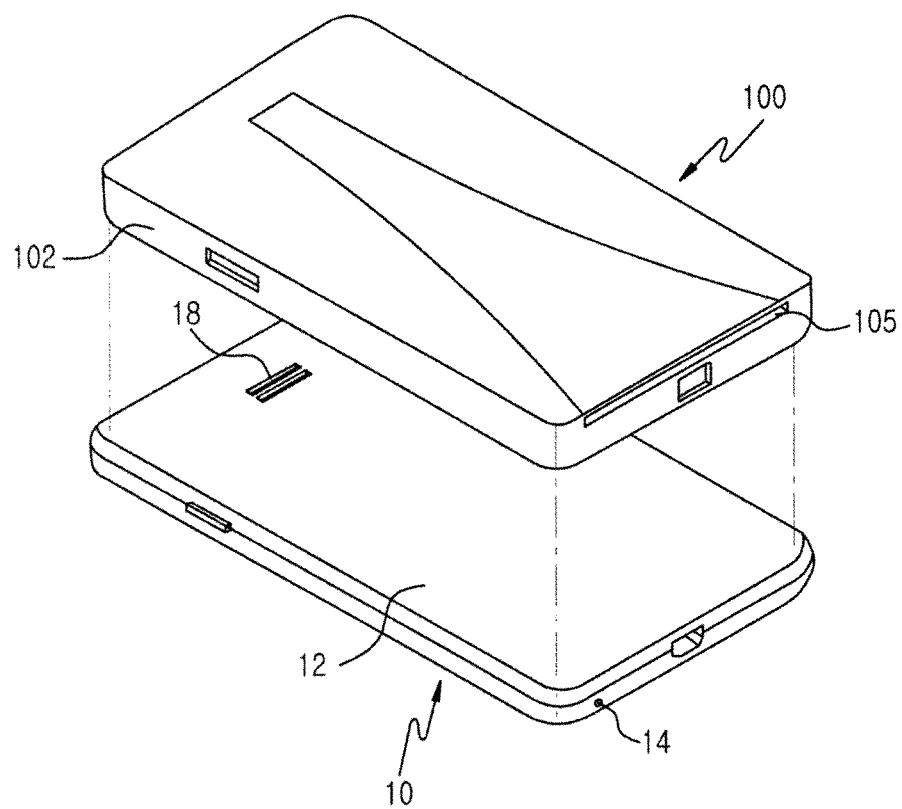
FIG. 2 is a bottom perspective view illustrating a state in which a portable terminal is placed into the portable terminal protective case of FIG. 1.

The present invention illustrates a portable terminal as an electronic device and also illustrates a protective case applied to the portable terminal However, the present invention is not limited thereto, and thus the electronic device of the present invention can use the protective case, and can include various electronic devices including a speaker device. Examples of the electronic device include an MPEG Audio Layer-3 (MP3) player, a Portable Multimedia Player (PMP), various portable game machines, a tablet computer, a handheld computer, a Personal Digital Assistant (PDA), a cellular telephone, a network appliance, a camera, and a portable terminal such as a smart phone and an Enhanced General Packet Radio Service (EGPRS) mobile terminal FIG. 1 is a combined perspective view illustrating a state in which a portable terminal is placed into a protective case as an electronic device according to a 1$^{st}$ exemplary embodiment of the present invention. FIG. 2 is a perspective view illustrating a state in which a portable terminal is placed into the portable terminal protective case of FIG. 1, viewed from a different angle.

Referring to FIGS. 1 and 2, a portable terminal 10 is placed into a portable terminal protective case 100 to beatify the exterior thereof or improve a grip feel and to protect the portable terminal 10 from an external impact forces.

The exemplary portable terminal 10 depicted in FIGS. 1 and 2, is a smart phone. A display device 15 which occupies a greater part of a front side 11 is placed to the front side of the portable terminal, an ear piece 13 for receiving a voice of a peer user is placed to an upper portion of the display device 15, and a microphone device 14 for transmitting a voice to the peer user is placed to a lower portion of the display device 15. In addition thereto, although not shown, such a smart phone may further include various sensors, such as a well-known digital camera module, an ambient light sensor, etc., to improve a function of the portable terminal 10.

Meanwhile, the protective case 100 of the terminal includes a base surface 101 contactable with a back side 12 of the portable terminal 10 and a lateral portion 102 formed with a specific height along a boundary of the base surface 101. Therefore, a placement space 103 of the portable terminal 10 can be formed by the base surface 101 and the lateral portion 102, and the portable terminal 10 can be placed tightly to the placement space 103. Therefore, the portable terminal protective case 100 is preferably made of at least one of materials having elasticity, such as a synthetic resin material, a rubber material, a silicon material, and a urethane material.

Although it is shown in FIGS. 1 and 2 that the protective case includes base surface 101 and the lateral portion 102 extended from the base surface 101 to protect the lateral side of the portable terminal 10, the present invention is not limited thereto, and thus the protective case may be implemented only with a base surface attached to only the back side of the terminal in an attached manner by using a specific adhesive material.

In this case, according to the present invention, the portable terminal protective case 100 must have a speaker hole 18 capable of outputting a speaker sound of a speaker device installed in the portable terminal 10 and which is placed on least one of surface of the portable terminal 10. Therefore, according to the 1$^{st}$ exemplary embodiment of the present invention, the speaker hole 18 is placed to the back side 12 of the portable terminal 10, and a speaker sound amplification path 104 corresponding thereto is also formed in the base surface 101 of the portable terminal protective case 100 adjacent with the back side 12 of the portable terminal 10. As shown in this exemplary embodiment a horn path may be used as the speaker sound amplification path.

The speaker sound amplification path 104 is formed to have a speaker sound output hole 105 which has a specific width and a specific depth in the base surface 101 of the portable terminal protective case 100 and which is open to an external side of the protective case. That is, the speaker sound amplification path 104 is formed by a depression or channel. The depression or channel starts from a position corresponding to the speaker hole 18 of the portable terminal 10 and extends to an end portion of the portable terminal protective case 100. That is, the speaker sound output hole 105 is formed in the end portion of the portable terminal protective case 100, and a speaker sound output through the speaker hole 18 of the portable terminal 10 is amplified through the speaker sound amplification path 104 and thereafter is output through the speaker sound output hole 105 of the portable terminal protective case 100. Then, the speaker sound is provided to a listener.

Figure 3:
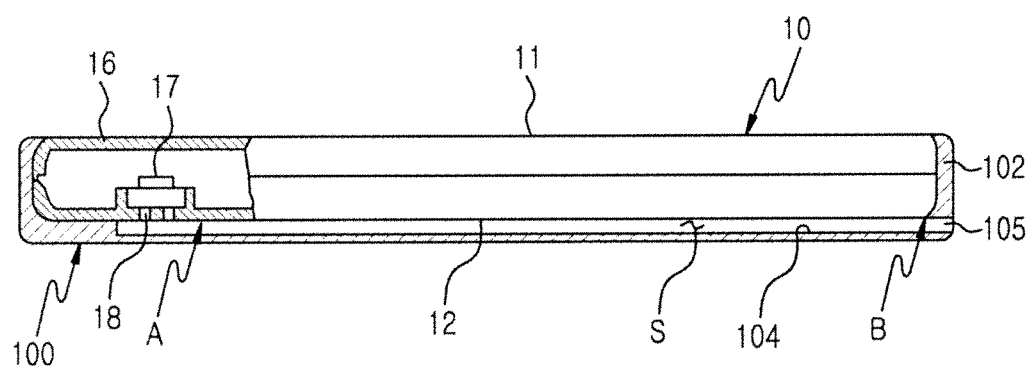
FIG. 3 is a cross-sectional view in which a portable terminal is received into the portable terminal protective case of FIG. 1.
Figure 4:
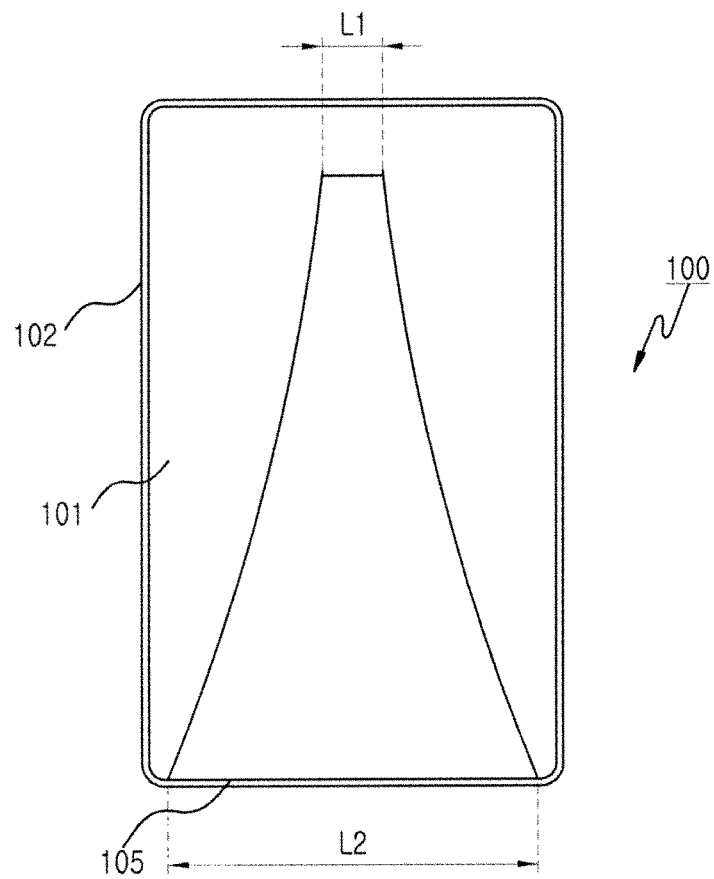
FIG. 4 is a plan view of the portable terminal protective case of FIG. 1.

FIG. 3 is a cross-sectional view illustrating a state in which a portable terminal is placed to the portable terminal protective case of FIG. 1. FIG. 4 is a plan view of the portable terminal protective case of FIG. 1.

Referring to FIG. 3 and FIG. 4, when the portable terminal 10 is placed to the portable terminal protective case 100, the speaker sound amplification path 104 which is formed to be lower than the base surface 101 while in contact with the back side 12 of the portable terminal 10 and the base surface 101 of the portable terminal protective case 100 can be used as a space S for amplifying a speaker sound. In this case, the speaker sound output from a speaker device 17 installed inside a case frame 16 of the portable terminal 10 is delivered to the speaker sound amplification path 104 through the speaker hole 18, and is output by being amplified through the speaker sound output hole 105 of the portable terminal protective case 100.

In order to amplify the speaker sound output from the portable terminal 10, the width must be gradually widened from a portion A of the speaker sound amplification path 104 corresponding to a portion in which the speaker hole 18 is formed to a portion B of the speaker sound output hole 105 for outputting the speaker sound. That is, as illustrated in FIG. 4, the speaker sound amplification path 104 is formed such that a width L1 of a first start portion is the narrowest, and a width L2 of the speaker sound output hole for outputting the speaker sound is the widest. Alternatively, in another method, an area of the speaker sound amplification path is increased as approaching to the speaker sound output hole. Although not shown, a depth of the speaker sound amplification path is gradually increased as approaching from the portion A to the portion B.

Figure 5:
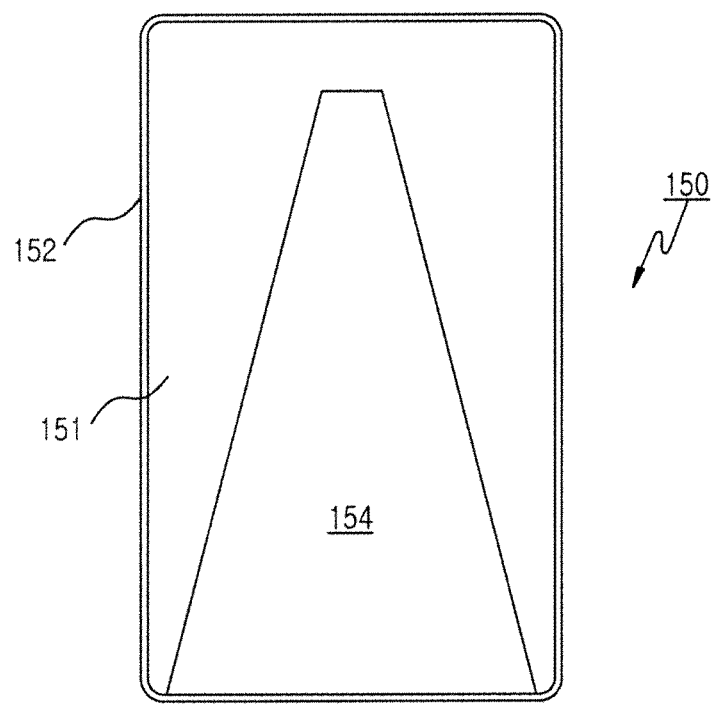
FIG. 5 is a plan view of a portable terminal protective case according to a $2^{nd}$ exemplary embodiment of the present invention.

FIG. 5 is a plan view of a portable terminal protective case according to a $2^{nd}$ exemplary embodiment of the present invention.

Referring to FIG. 5, in comparison with the case of FIG. 4 in which the width of the speaker sound amplification path 104 is gradually increased as approaching to the speaker sound output hole and in which the base surface 101 of the portable terminal protective case 100 and a border portion of the speaker sound amplification path 104 are formed in a curved manner, in the case of FIG. 5, a base surface 151 of a portable terminal protective case 150 including a lateral portion 152 and a border portion of a speaker sound amplification path 154 have a linear shape and a width thereof is gradually increased such that there is an angle between the lateral portion 152 and the border portion of the speaker sound amplification path 154.

In addition to the cases of FIG. 4 and FIG. 5, the speaker sound amplification paths 104 and 154 applied to the portable terminal protective cases 100 and 150 may have various shapes in which a width, area, and depth thereof are gradually increased to amplify a speaker sound as approaching to the speaker sound output hole.

Figure 6:
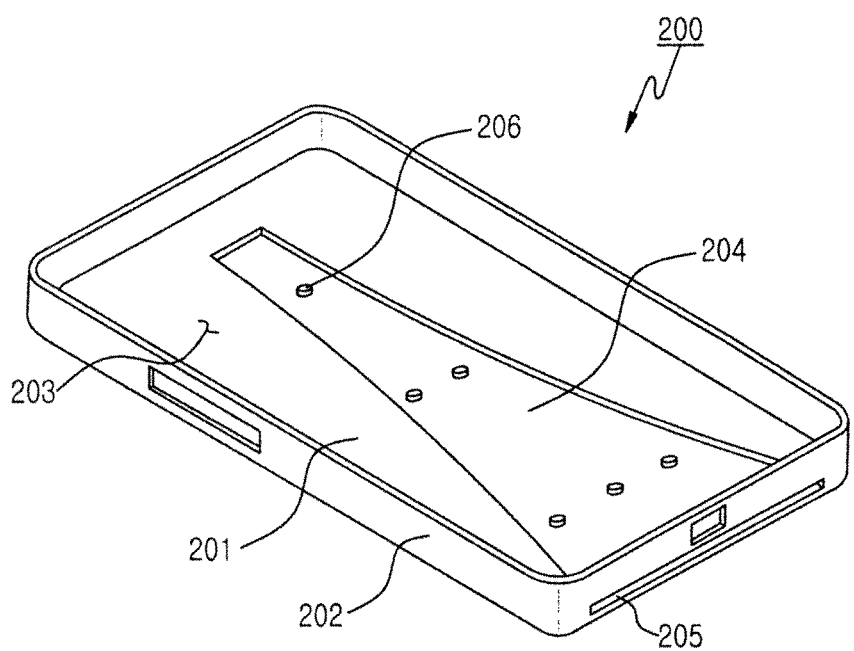
FIG. 6 is a perspective view of a portable terminal protective case according to a $3^{rd}$ exemplary embodiment of the present invention.
Figure 7:
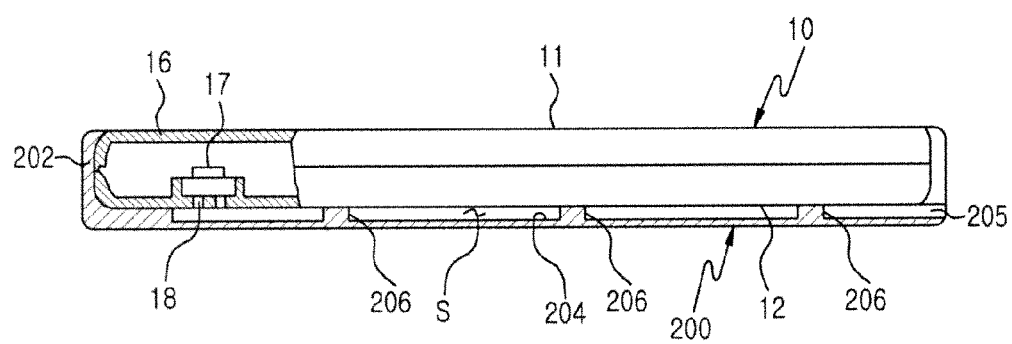
FIG. 7 is a cross-sectional view illustrating a state in which a portable terminal is received into the portable terminal protective case of FIG. 6.

FIG. 6 is a perspective view of a portable terminal protective case according to a $3^{rd}$ exemplary embodiment of the present invention. FIG. 7 is a cross-sectional view illustrating a state in which a portable terminal is placed into the portable terminal protective case of FIG. 6.

Referring to FIG. 6 and FIG. 7, as described above, a portable terminal protective case 200 is preferably formed by molding a synthetic resin material, a rubber material, a silicon material, or a urethane material. Therefore, a speaker sound amplification path 204 formed to be lower than a base surface 201 of the portable terminal protective case 200 and formed to have a width which is increased gradually amplifies a constant speaker sound since a speaker sound amplification space S is formed within a base of the portable terminal protective case 200. However, if the portable terminal protective case 200 made of a flexible material it may become distorted when a user holds it, and a portion of the speaker sound amplification path 204 may become in contact with the base 12 of the portable terminal 10, and an obstruction would be created in the speaker sound amplification path 204. Thus a speaker sound may not be smoothly amplified. In the present embodiment, a plurality of spacers 206 are formed or installed in the speaker sound amplification path 104 to prevent distortion of the speaker sound amplification path 204.

Therefore, as illustrated in FIG. 6, the portable terminal protective case 200 includes the base surface 201 and a lateral portion 202 extended with a specific height along a boundary of the base surface 201, and a portable terminal placement space 203 is formed by the base surface 201 and the lateral portion 202. Of course, the speaker sound amplification path 204 having the aforementioned shape is formed in the base surface 201, and the plurality of spacers 206 are placed to the speaker sound amplification path 204 in a protruded manner with a specific interval. The spacer 206 is preferably molded in an integral manner when molding the portable terminal protective case 200. In addition, a height of the spacer 206 is preferably made equal to a height of the base surface 201 so that when the portable terminal 10 is installed in the protective case 200, the portable terminal placement space 203 remains in contact with the portable terminal. This is because the speaker sound to be amplified is leaked when the height of the spacer 206 is higher than that of the base surface, which would cause a sound loss.

Accordingly, as illustrated in FIG. 7, when the portable terminal 10 is placed to the portable terminal protective case 200, the spacer 206 formed in the speaker sound amplification path 204 supports the back side 12 of the portable terminal 10 by the height from the speaker sound amplification path 204 to the base surface 201. Therefore, even if the user holds the portable terminal 10, the back side 12 of the portable terminal 10 is prevented from being randomly in contact with the speaker sound amplification path 204 by distortion of the portable terminal protective case 200. However, when implementing the spacer 206, the number of spacers 206 needs to be as small as possible to provide structural support while providing that a smooth amplification of the speaker sound output from the speaker device 17 through the speaker hole 18 is not impaired.

Further, as described above, when a depth of the speaker sound amplification path 204 is increased as approaching to speaker sound output hole 205, the extended height of the spacer 206 may be changed to correspond to the increased depth of the speaker sound amplification path 204. This is because an upper portion of the spacer 206 coincides with a base surface of the protective case 200 so that it is uniformly adhered to the back side 12 when the portable terminal 10 is in place within the case.

Figure 8:
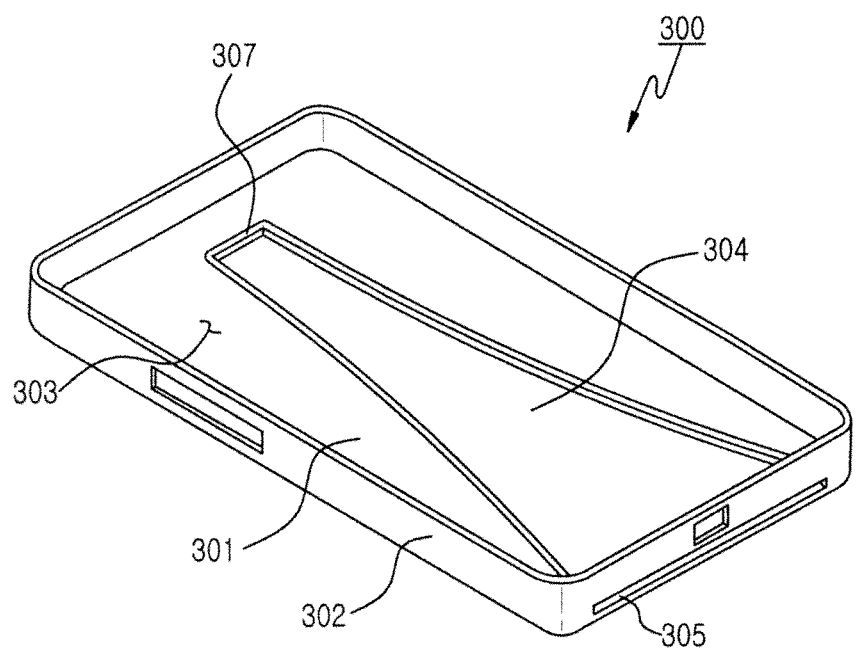
FIG. 8 is a perspective view of a portable terminal protective case according to a $4^{th}$ exemplary embodiment of the present invention.
Figure 9:
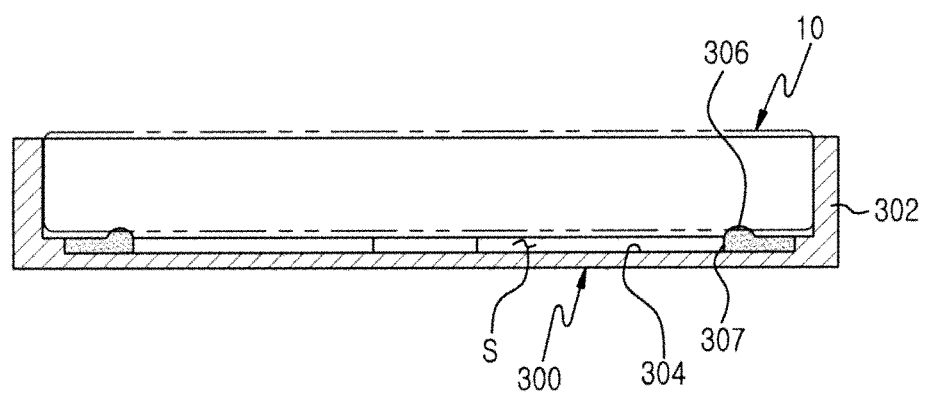
FIG. 9 is a cross-sectional view illustrating a state in which a portable terminal is received into the portable terminal protective case of FIG. 8.

FIG. 8 is a perspective view of a portable terminal protective case according to a $4^{th}$ exemplary embodiment of the present invention. FIG. 9 is a cross-sectional view illustrating a state in which a portable terminal is placed into the portable terminal protective case of FIG. 8.

As described in the aforementioned embodiments, the amplified speaker sound output through the speaker sound output hole of the portable terminal protective case via the speaker sound amplification path significantly depends on a sealing between the base of the portable terminal protective case and the speaker sound amplification path. That is, a more amplified speaker sound can be output to the outside of the portable terminal protective case by ensuring that there is complete sealing between the base of the portable terminal protective case and the speaker sound amplification path.

Therefore, referring to FIG. 8 and FIG. 9, a portable terminal protective case 300 also forms a base surface 301 and a lateral portion 302 extended along a boundary of the base surface 301 and thus provides a portable terminal placement space 303. Thereafter, a sealing member 307 having a higher height than the base surface 301 is formed in the base surface 301 of the portable terminal protective case 300 along a border portion of a speaker sound amplification path 304. More specifically, it is preferable to form a protrusion contactable to the back side 12 of the portable terminal 10. The sealing member 307 is preferably formed in an integral manner with the portable terminal protective case 300. For example, as illustrated in FIG. 9, the sealing member 307 may be made of a softer resilient material which can be insert-molded along a border portion of the speaker sound amplification path 304 and the base surface 301 of the portable terminal protective case 300 made of a solid synthetic resin material. Representative examples of the soft material may include silicon, rubber, etc.

Therefore, as illustrated in FIG. 9, when the portable terminal 10 is placed to the portable terminal protective case 300, a speaker sound amplification space S is formed between the speaker sound amplification path 304 and the portable terminal 10. In this case, since a protrusion 306 of the sealing member 307 formed near a border portion of the speaker sound amplification path 304 is slightly compressed and therefore is adhered to the portable terminal 10 in the base surface of the portable terminal protective case 300, thus completely sealing the speaker sound amplification space S from the outside.

Figure 10:
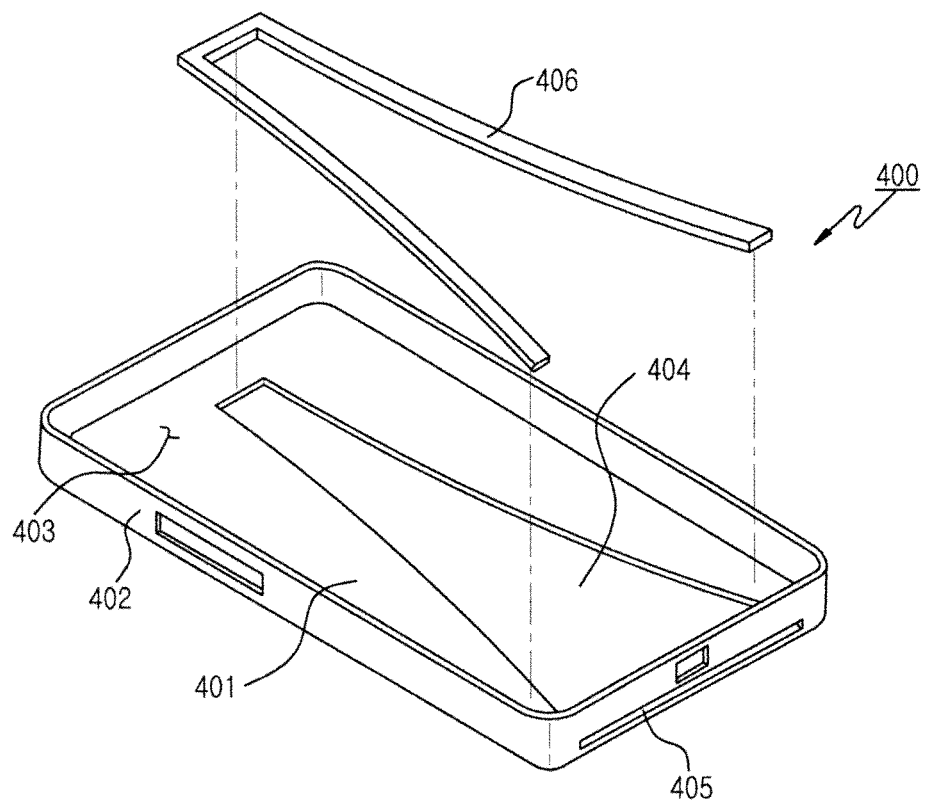
FIG. 10 is a exploded perspective view of a portable terminal protective case and a sealing member according to a $5^{th}$ exemplary embodiment of the present invention.
Figure 11:
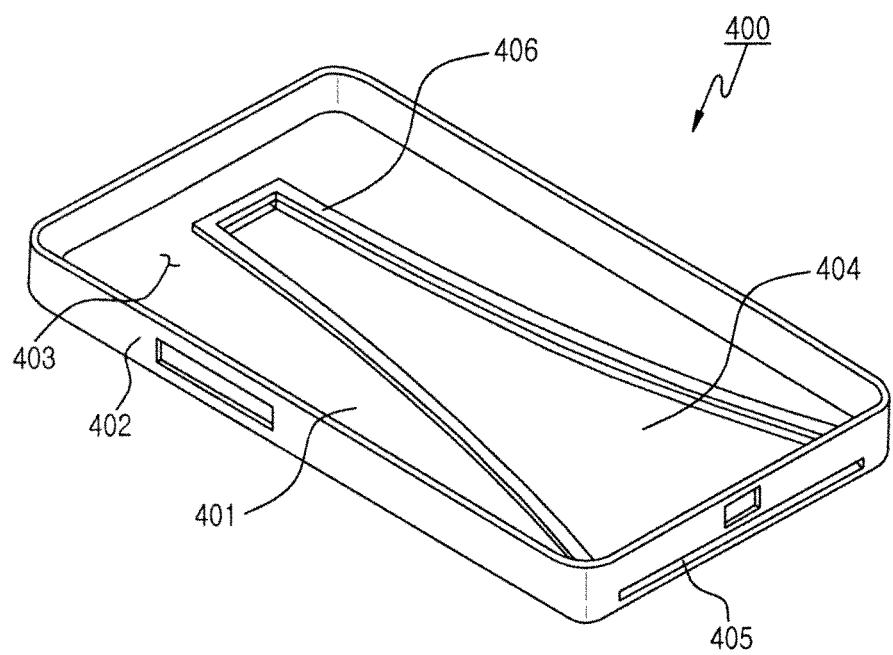
FIG. 11 is a perspective view in which a sealing member is received into the portable terminal protective case of FIG. 10.

FIG. 10 is a perspective view of a portable terminal protective case in a state in which a sealing member is placed according to a 5$^{th}$ exemplary embodiment of the present invention. FIG. 11 is a perspective view of a state in which a sealing member is placed into the portable terminal protective case of FIG. 10.

Referring to FIG. 10 and FIG. 11, in the present embodiment, a material having a specific width and capable of being adhered to another surface is used as a sealing member 406. The sealing member 406 may use a material having an adhesive surface, such as poron, rubber, silicon, etc.

Therefore, similarly to the aforementioned 1$^{st}$ exemplary embodiment, a terminal placement space 403 is formed in a base surface 401 of a portable terminal protective case 400 due to the base surface 401 and a lateral portion 402, and a speaker sound amplification path 404 is formed in the base surface 401. The speaker sound amplification path 404 is implemented such that an amplified speaker sound is output through a speaker sound output hole 405 formed in one end of the portable terminal protective case 400.

In this case, the sealing member 406 can be attached along a border portion of the speaker sound amplification path 404 in the base surface 401. In doing so, the sealing member 406 can be added to the existing speaker sound amplification path 404, and a vendor can make available the portable terminal protective case 400 having only the speaker sound amplification path 404 without the sealing member 406 and can sell the adhesive-type sealing member 406 separately in addition to the portable terminal protective case 400.

Figure 12:
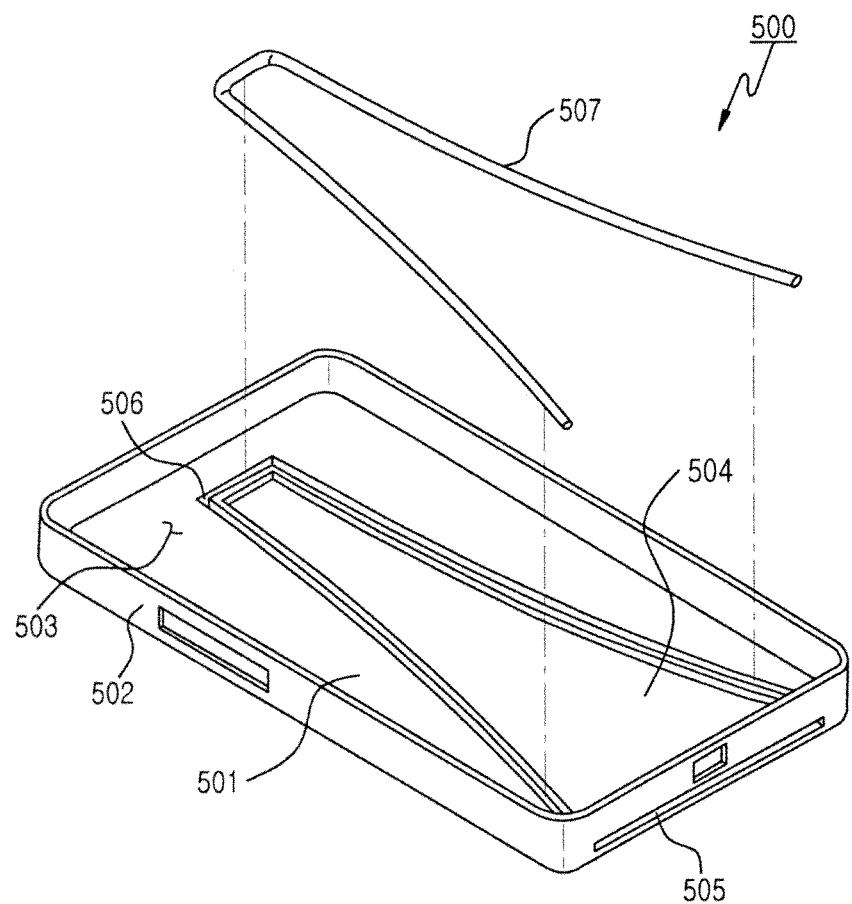
FIG. 12 is an exploded perspective view of a portable terminal protective case and an alternate sealing member according to a $6^{th}$ exemplary embodiment of the present invention.
Figure 13:
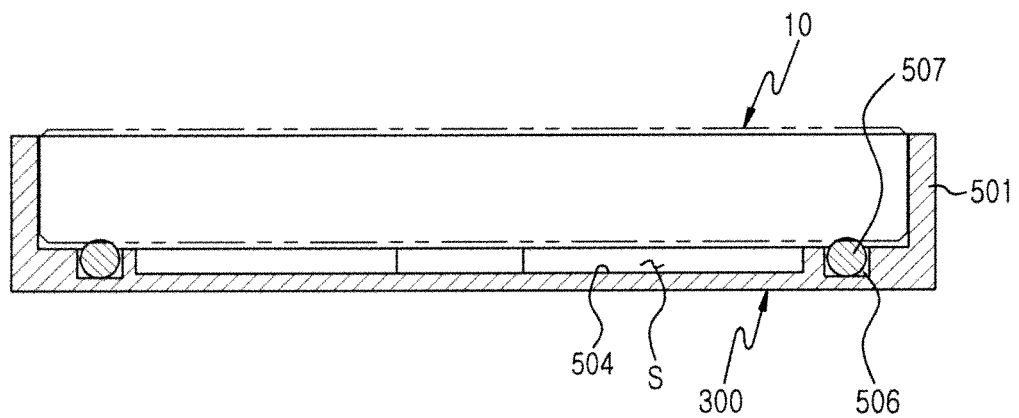
FIG. 13 is a cross-sectional view wherein a portable terminal is received into the portable terminal protective case of FIG. 12.

FIG. 12 is a perspective view of a portable terminal protective case in a state in which a sealing member is placed according to a 6$^{th}$ exemplary embodiment of the present invention. FIG. 13 is a cross-sectional view illustrating a state in which a portable terminal is placed into the portable terminal protective case of FIG. 12.

Referring to FIG. 12 and FIG. 13, the aforementioned sealing member may be formed in an integral manner or may be installed in an attachment manner. However the sealing member may lose a sealing function when it is used for a long period time since a protrusion portion may become overly compressed thus losing its elasticity and is worn out. Therefore, in this case, a replaceable sealing member can be applied.

A portable terminal protective case 500 has a base surface 501 and a lateral portion 502. A terminal placement space 503 is formed by the base surface 501 and the lateral portion 502. A speaker sound amplification path 504 is formed in the base surface 501. Further, a recess channel 506 having a specific depth is formed along a border portion of the speaker sound amplification path 504 in the base surface. A sealing member 507 is completely inserted to the recess 506. One portion of the sealing member 507 protrudes above the base surface, and as illustrated in FIG. 13, and thus when the portable terminal 10 is placed into the protective case 500, the sealing member 507 is in contact with the portable terminal 10. Thus, a speaker sound amplification space S formed by the speaker sound amplification path 504 and the portable terminal 10 is completely sealed. If necessary, a user may exchange a new sealing member to replace an old sealing member when necessary. The sealing member 507 applied in this case is preferably a material having elasticity, such as rubber and silicon. A cross section of the sealing member 507 may be formed in various shapes such as a circular shape, a rectangular shape, etc.

Figure 14:
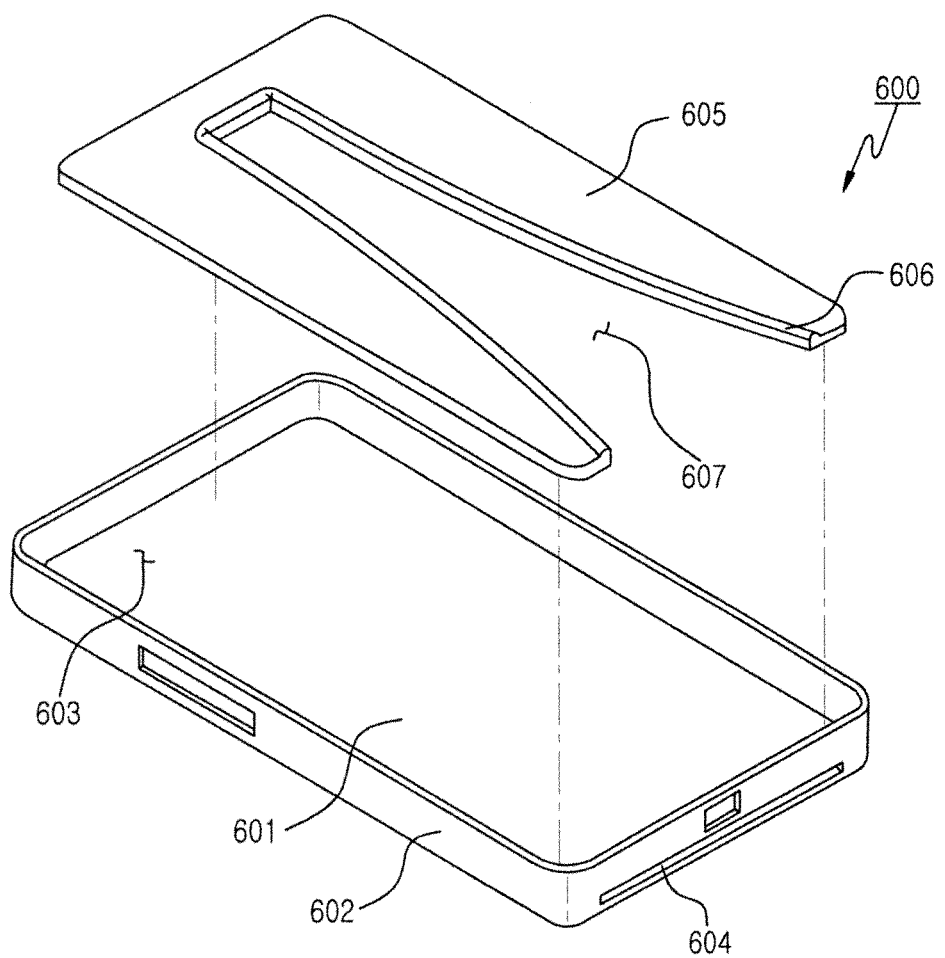
FIG. 14 is an exploded perspective view of a portable terminal protective case and a speaker sound amplification path member according to a $7^{th}$ exemplary embodiment of the present invention.

FIG. 14 is a perspective view of a portable terminal protective case in a state in which a speaker sound amplification path member is placed according to a 7$^{th}$ exemplary embodiment of the present invention.

Referring to FIG. 14, a portable terminal protective case 600 includes the base surface 601 and a lateral portion 602 extended with a specific height along a boundary of the base surface 601, and a terminal placement space 603 is formed by the base surface and the lateral portion. In this case, a speaker sound amplification path member 605 having a specific height may be attached to the base surface 601. The speaker sound amplification path member 605 is formed in a plate type having a sound amplification path space 607, and is entirely attached to the base surface 601 of the portable terminal protective case 600 to provide a space for amplifying a speaker sound. In this case, a sealing member 606 is formed in an integral manner along a boundary of the sound amplification path space 607 of the speaker sound amplification path member 605.

Figure 15:
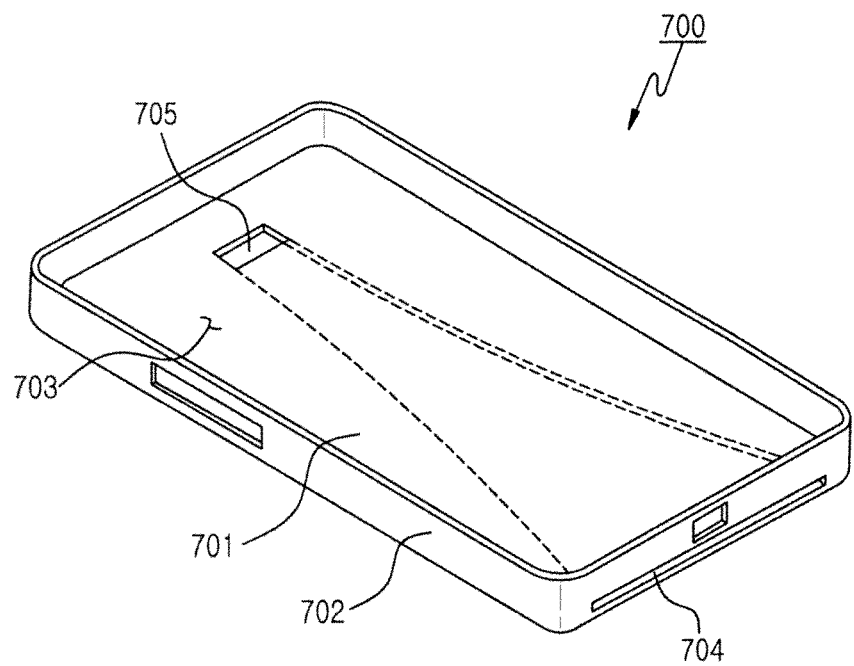
FIG. 15 is a perspective view of a portable terminal protective case having a speaker sound amplification path according to an 8$^{th}$ exemplary embodiment of the present invention.
Figure 16:
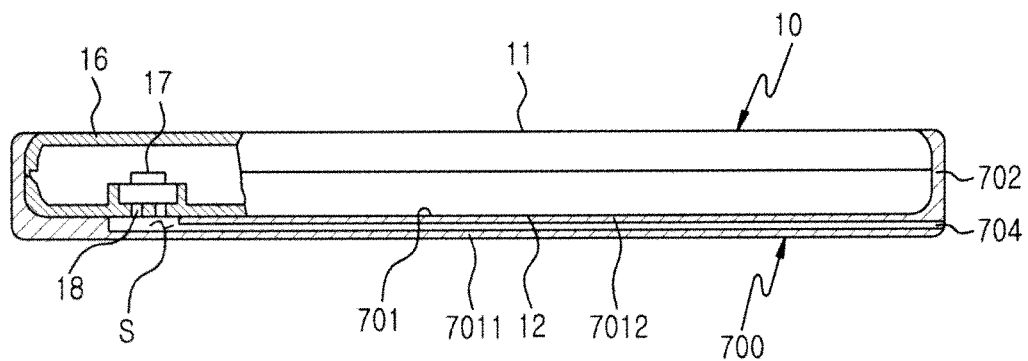
FIG. 16 is a cross-sectional view illustrating a portable terminal is received into the portable terminal protective case of FIG. 15.

FIG. 15 is a perspective view of a portable terminal protective case having a speaker sound amplification path according to an 8$^{th}$ exemplary embodiment of the present invention. FIG. 16 is a cross-sectional view illustrating a state in which a portable terminal is placed into the portable terminal protective case of FIG. 15.

Referring to FIG. 15 and FIG. 16, in the aforementioned embodiments, a speaker sound amplification path is formed in a base surface of the portable terminal protective case such that the speaker sound amplification path is lower than the base surface, and when placing a portable terminal, a speaker sound amplification space is formed by using a sealing structure between the back side of the portable terminal and the speaker sound amplification path. However, since a sealing member is entirely applied along a boundary of the speaker sound amplification path in these embodiments, manufacturing cost may increase.

Accordingly, in the present embodiment, a speaker sound amplification space is formed in an internal space S of a base surface 701 of a portable terminal protective case 700 to implement a complete sound amplification space without the need for an additional sealing member. In other words, the protective case 700 comprise an outer protective case wall 7011 and an adjacent inner base wall 7012 so that the speaker sound amplification path is formed a space S between the outer protective case wall 7011 and the adjacent inner base wall 7012. Of course, as illustrated, a through-hole 705 may be formed in a portion corresponding to the speaker hole 18 of the portable terminal 10, and a speaker sound may be delivered through the through-hole 705. Although not shown, a specific elastic sealing member as described in the aforementioned embodiments, may be installed or formed along a boundary of the through-hole 705.

Therefore, as illustrated in FIG. 16, when the portable terminal 10 is placed into a placement space 703 of the portable terminal protective case 700, the speaker sound output through the speaker hole 18 in the speaker device 17 is amplified without any sound leakage via the speaker sound amplification space S formed inside the base surface 701 of the portable terminal protective case 700, and the amplified speaker sound can be output through a speaker sound output hole 704.

Figure 17:
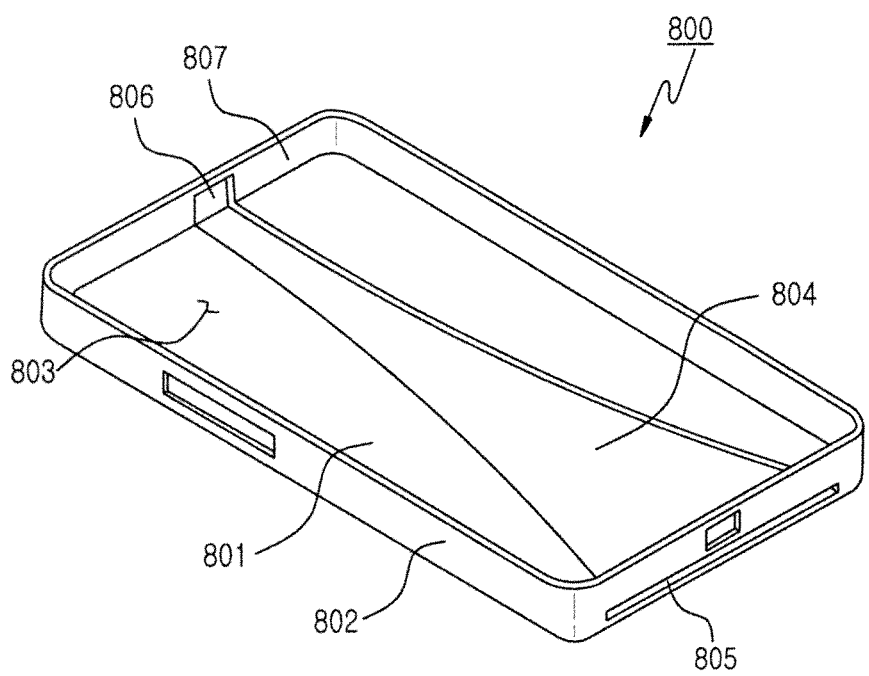
FIG. 17 is a perspective view of a portable terminal protective case according to a 9$^{th}$ exemplary embodiment of the present invention.
Figure 18:
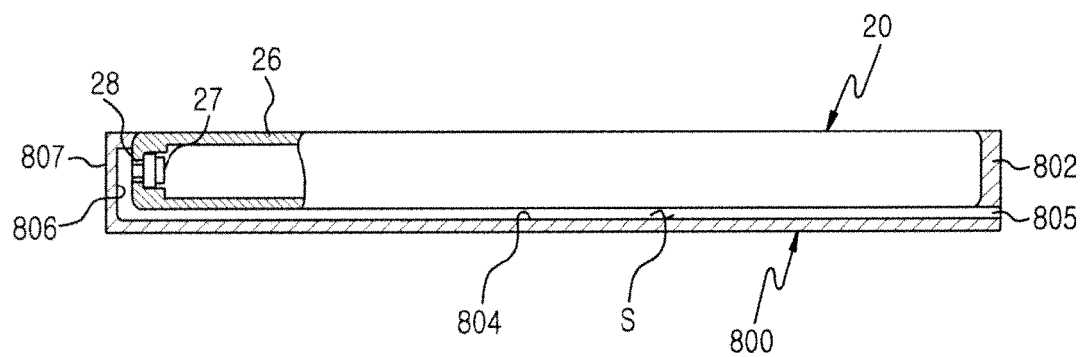
FIG. 18 is a cross-sectional view wherein a portable terminal is received into the portable terminal protective case of FIG. 17.

FIG. 17 is a perspective view of a portable terminal protective case according to a $9^{th}$ exemplary embodiment of the present invention. FIG. 18 is a cross-sectional view in which a portable terminal is placed into the portable terminal protective case of FIG. 17.

In the aforementioned embodiments, a structure of a speaker sound amplification path for amplifying a speaker sound and formed in a portable terminal protective case is described in a state in which a speaker device and a speaker hole are formed in the back side of the portable terminal.

In the present embodiment, a state in which the speaker and the speaker hole are formed in the lateral side of the portable terminal is illustrated. In this case, the speaker sound can also be amplified through speaker sound amplification paths formed in the portable terminal protective case.

As illustrated in FIG. 17, a portable terminal protective case 800 includes a base surface 801 having a specific width and a lateral portion 802 extended with a specific height along a boundary of the base surface 801. Therefore, a placement space 803 of a portable terminal 20 can be formed by the base surface 801 and the lateral portion 802. A $1^{st}$ speaker sound amplification path 804 is formed in the base surface 801. A $2^{nd}$ speaker sound amplification path 806 is formed in an inner lateral portion 807 of the portable terminal protective case 800. The $1^{st}$ speaker sound amplification path 804 and the $2^{nd}$ speaker sound amplification path 806 are extended from each other. The $2^{nd}$ speaker sound amplification path 806 is formed at a position corresponding to a speaker hole 28 formed in a lateral side of the portable terminal 20.

Therefore, as illustrated in FIG. 18, when the portable terminal 20 is placed into the portable terminal protective case 800, the lateral side and back side of the portable terminal 20 are formed in a speaker sound amplification space S together with the $1^{st}$ and $2^{nd}$ speaker sound amplification paths 804 and 806. In this case, a speaker device 27 is installed in an inner lateral portion of a case frame 26 of the portable terminal 20, and a speaker sound of the speaker device 27 is output through a speaker hole 28 formed in the lateral side of the portable terminal 20. The output speaker sound is output to a speaker sound output hole 805 of the portable terminal protective case 800 via the $1^{st}$ speaker sound amplification path 804 and the $2^{nd}$ speaker sound amplification path 806 of the portable terminal protective case 800.

That is, even if the speaker device 27 of the portable terminal 20 is placed not in the back side but in the lateral side of the portable terminal, the speaker sound can be smoothly amplified by using the portable terminal protective case 800.

Figure 19:
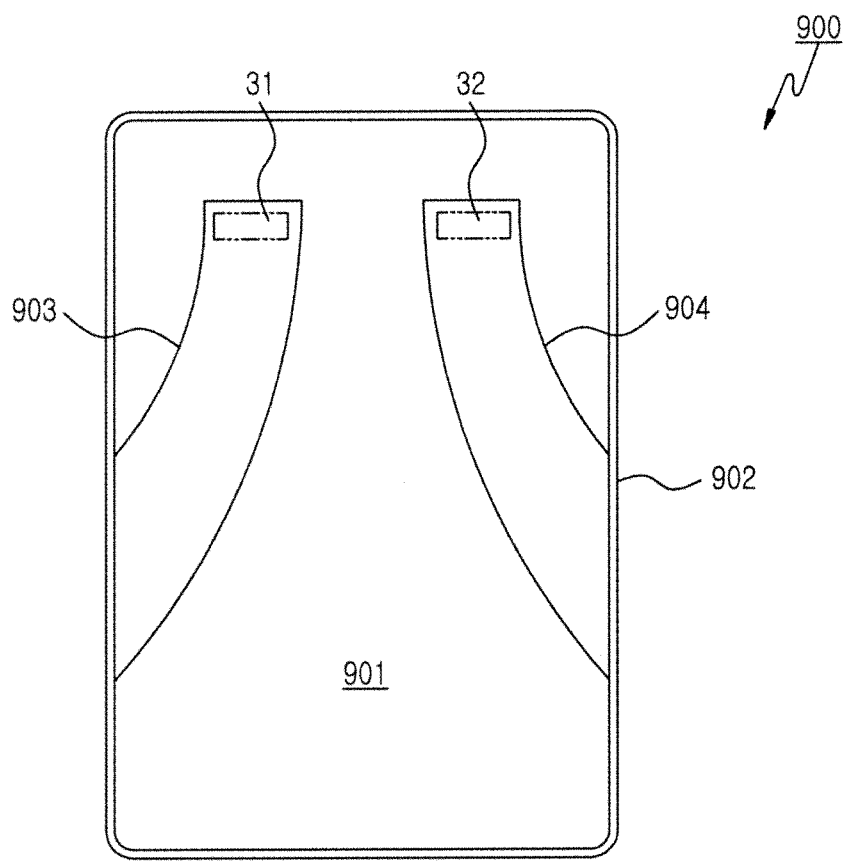
FIG. 19 and FIG. 20 are plan views of a portable terminal protective case illustrating a speaker sound amplification path having various shapes applied to the protective case when a portable terminal uses a dual speaker according to a 10$^{th}$ exemplary embodiment of the present invention.
Figure 20:
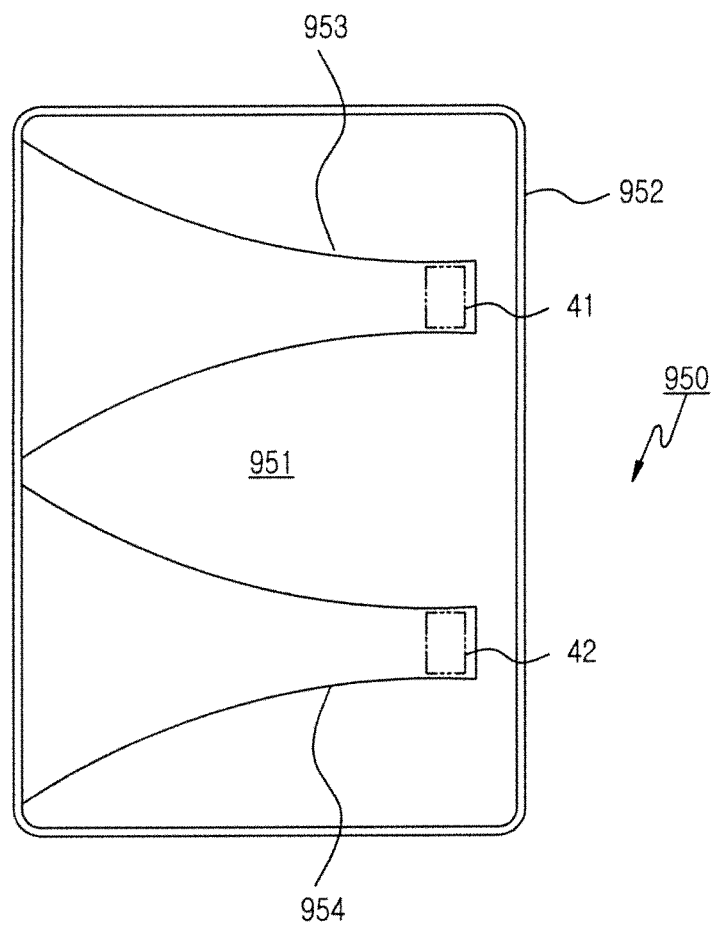

FIG. 19 and FIG. 20 are plan views of a portable terminal protective case illustrating a speaker sound amplification path having various shapes applied to the protective case when a portable terminal uses a dual speaker according to a $10^{th}$ exemplary embodiment of the present invention.

A state of applying one speaker sound amplification path capable of amplifying a speaker sound corresponding to one speaker device to a portable terminal protective case in various manners has been described in the aforementioned embodiments.

In the present embodiments, a pair of speaker sound amplification paths formed inside the portable terminal protective case in accordance with a dual speaker device installed with a specific interval in the portable terminal will be described.

As illustrated in FIG. 19, if a $1^{st}$ speaker device 31 and a $2^{nd}$ speaker device 32 of the portable terminal are installed in parallel in a widthwise direction of the terminal (herein, the portable terminal is omitted, and only the speaker devices installed in the portable terminal are illustrated), respective speaker sound amplification paths 903 and 904 can be formed in a vertical symmetric manner. In this case, the $1^{st}$ speaker sound amplification path 903 corresponding to the $1^{st}$ speaker device 31 may extend to a speaker sound output hole formed in one side between left and right sides of the portable terminal protective case 900, and the $2^{nd}$ speaker sound amplification path 904 corresponding to the $2^{nd}$ speaker device 32 may extend to a speaker sound output hole formed in the other side of the portable terminal protective case 900.

Of course, in this case, the $1^{st}$ speaker sound amplification path 903 and the $2^{nd}$ speaker sound amplification path 904 can share the aforementioned various exemplary speaker sound amplification path. However, in order to amplify the speaker sound with a constant magnitude, each speaker amplification path is preferably formed in the same size.

Meanwhile, as illustrated in FIG. 20, if a $3^{rd}$ speaker device 41 and a $4^{th}$ speaker device 42 of the portable terminal are installed in parallel in a lengthwise direction of the terminal, respective speaker sound amplification paths 953 and 954 can be formed in a horizontal symmetric manner. In this case, the $3^{rd}$ speaker sound amplification path 953 corresponding to the $3^{rd}$ speaker device 41 may extend to a speaker sound output hole formed in one side between upper and lower sides of the portable terminal protective case 950, and the $4^{th}$ speaker sound amplification path 954 corresponding to the $4^{th}$ speaker device 42 may extend to a speaker sound output hole formed in the other side of the portable terminal protective case 950.

Of course, in this case, the $3^{rd}$ speaker sound amplification path 95 and the $4^{th}$ speaker sound amplification path 954 can share the aforementioned various exemplary speaker sound amplification path. However, in order to amplify a speaker sound with a constant magnitude, each speaker amplification path is preferably formed in the same size.

Although two speaker devices are applied in the present embodiment, the aforementioned embodiments are also applicable when the number of speaker devices in use is more than 2, and the speaker sound amplification path can be formed in various shapes and numbers in order to accommodate the specific geometry and speaker placement position of the particular portable terminal.

Figure 21:
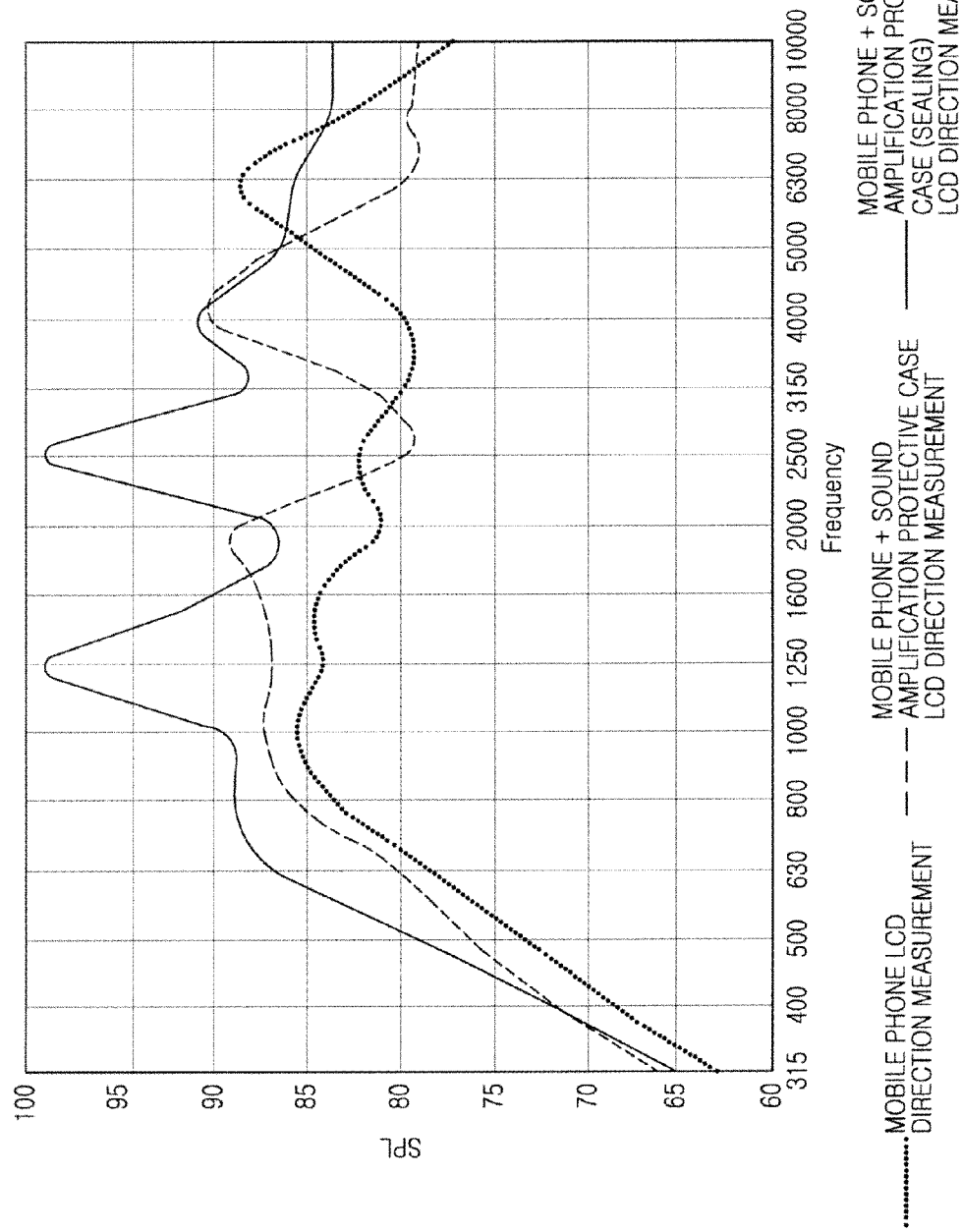
FIG. 21 is a graph illustrating a change in a sound volume before and after utilizing a portable terminal protective case for speaker sound amplification with a portable terminal.

FIG. 21 is a graph illustrating a change in a sound volume before and after placing a portable terminal protective case for speaker sound amplification to a portable terminal.

Referring to FIG. 21, in case of a portable terminal placed into a portable terminal protective case in which a speaker sound amplification path is added, a sound volume is amplified by from 2 dB~3 dB to over 7 dB approximately, as compared to a portable terminal wherein a speaker sound amplification path is not added. In addition, in the case of a portable terminal placed into a portable terminal protective case in which a sealing member is applied to a speaker sound amplification path, a sound volume is amplified by from 3 dB to 5 dB to over 15 dB approximately, as compared to a portable terminal wherein the speaker sound amplification path is not added.

As would be seen by one skilled in the art there are various methods capable of modifying these embodiments without departing from the scope of claims in the present invention. In other words, there may be many other methods for which the present invention can be implemented without departing from the scope of the claims.

For example, although a speaker sound amplification path is provided to one portable terminal protective case in the present invention, a speaker sound amplification path can be defined by applying two or more protective cases to the portable terminal thus combining the protective cases.

The present invention excludes any additional device for amplifying a speaker sound of an electronic device, and the speaker sound is amplified exclusively by adding a sound amplification path to a protective case for the electronic device, and thus an additional cost is not produced.

In addition, since the sound amplification path is added to the protective case for the electronic device, the present invention has an advantage in that portability is improved in comparison with a case where a speaker sound amplification device is additionally carried, and a risk of loss is completely excluded.

In addition, the present invention also has an advantage in that usage convenience of the electronic device can be improved while amplifying a speaker sound since a separate speaker sound amplification device is not additionally installed in the electronic device.

In addition, the protective case may be battery cover of the electronic device having a battery pack. Also, the protective case may be at least one case frame of the electronic device.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A protective case for an electronic device having a front side and a rear side and at least one speaker device, the protective case comprising:
    a base configured for placement adjacent to a rear side of the electronic device to protect the electronic device;
    wherein a speaker sound path is formed in the base and having a specific depth, having a first end at a first location corresponding to a speaker hole of the electronic device for the output of a speaker sound of the speaker device, the sound path being continuous from the first end to a second, opposite end of the speaker sound path at a periphery of the base, so as to form a speaker sound output hole having an end face at the periphery of the base, the end face of the output hole being beneath the rear side of the electronic device when the electronic device is oriented with the rear side beneath the front side, the end face of the output hole facing outwards laterally from the case;
    wherein the speaker sound which is output from the speaker hole is amplified within the speaker sound path and is then output through the speaker sound output hole; and
    wherein the electronic device and an upper surface of the base are in contact and the speaker sound path is formed from a gap between the electronic device and the protective case.

2. The protective case of claim 1, wherein the speaker sound path is formed having a cross-sectional area that is gradually widened in a direction towards the speaker sound output hole.

3. The protective case of claim 2, further comprising a plurality of spacers in the gap between the electronic device and the protective case, the spacers formed as disk-like protrusions isolated on all lateral sides thereof within the sound path, which extend from a lower surface of the base up to a top surface of the base to support the gap of the speaker sound path.

4. The protective case of claim 1, wherein a sealing member is placed onto a surface of the base along a border portion of the speaker sound path, such that the sealing member is higher than a top surface of the base so that the speaker sound path is completely sealed when the electronic device is installed within the protective case.

5. The protective case of claim 4,
    wherein the sealing member is insert-molded along the border portion of the speaker sound path in the base, and
    wherein the sealing member is of the type having a flexible resilient material.

6. The protective case of claim 4,
    wherein the sealing member is adhesively secured with an adhesive along the border portion of the speaker sound path in the base, and
    wherein the adhesive is selected from the group consisting of poron, rubber, and silicon.

7. The protective case of claim 4,
    wherein a recess having a specific depth is formed along the border portion of the speaker sound path in the base, and
    the sealing member is inserted into the recess such that a portion of the sealing member protrudes from the top surface of the base.

8. The protective case of claim 4, wherein the protective case is of the type having a flexible material selected from the group consisting of rubber or silicon, and wherein the sealing member is an integral part of the protective case and a portion of the sealing member protrudes from the top surface of the base.

9. The protective case of claim 1, further comprising a speaker sound path member which borders an open space for the speaker sound path.

10. The protective case of claim 9, further comprising a sealing member along a boundary of the open space of the speaker sound path member, wherein the sealing member is higher than an adjacent surface of the speaker sound path member.

11. The protective case of claim 1, wherein the protective case further includes a lateral portion having a predetermined height along a boundary of the base for covering a lateral side of the electronic device.

12. The protective case of claim 11,
    wherein the lateral portion includes an inner wall, and
    wherein the speaker device outputs the speaker sound through a speaker hole formed in the lateral side of the electronic device, and wherein the speaker sound path extends up to the lateral portion of the inner wall of the protective case corresponding to the speaker hole.

13. The protective case of claim 12, further comprising a sealing member that extends up to the lateral portion of the inner wall of the protective case along the speaker sound path.

14. The protective case of claim 1,
further comprising at least one further speaker sound path, and
wherein the size of each of the speaker sound paths is the same.

15. The protective case of claim 1, wherein the protective case is of the type selected from the group consisting of rubber, silicon, urethane, and synthetic resin.

16. The protective case of claim 1, wherein the speaker sound path has a gradual increase in depth in a direction towards the speaker sound output hole.

17. The protective case of claim 1, wherein the protective case is battery cover of the electronic device or at least one case frame of the electronic device.

18. A protective case for an electronic device having a front side and a rear side and at least one speaker device, the protective case comprising:
a base configured for placement adjacent to a rear side of the electronic device to protect the electronic device;
wherein a speaker sound path is formed in the base and having a specific depth, having a first end at a first location corresponding to a speaker hole of the electronic device for the output of a speaker sound of the speaker device, the sound path being continuous from the first end to a second, opposite end of the speaker sound path at a periphery of the base, so as to form a speaker sound output hole having an end face at the periphery of the base, the end face of the output hole being beneath the rear side of the electronic device when the electronic device is oriented with the rear side beneath the front side, the end face of the output hole facing outwards laterally from the case;
wherein the speaker sound which is output from the speaker hole is amplified within the speaker sound path and is then output through the speaker sound output hole,
wherein the base comprises an outer protective case wall at a lowest level of the base in a thickness direction thereof, and a substantially parallel, opposing inner base wall at a higher level of the base in the thickness direction and disposed below the rear side of the electronic device when the electronic device is placed within the protective case, wherein the speaker sound path is formed of a space between the outer protective case wall and the opposing inner base wall and,
wherein a through-hole is formed in a portion of the inner base wall corresponding to the speaker hole of the electronic device, and
wherein the speaker sound output from the speaker hole is amplified within the speaker sound path through the through-hole and is output through the speaker sound output hole; and
further comprising a plurality of spacers in the space of the speaker sound path, the spacers formed as disk-like protrusions isolated on all lateral sides thereof within the space of the speaker sound path, the spacers supporting the space of the speaker sound path.

19. An electronic device comprising:
a rear side and a front side;
a speaker for outputting speaker sound; and
a protective case for protecting the electronic device and amplifying the speaker sound of the speaker;
wherein the protective case comprising:
a base configured for placement adjacent to a rear side of the electronic device to protect the electronic device;
wherein a speaker sound path is formed in the base and having a specific depth, having a first end at a first location corresponding to a speaker hole of the electronic device for the output of a speaker sound of the speaker device, the sound path being continuous from the first end to a second, opposite end of the speaker sound path at a periphery of the base, so as to form a speaker sound output hole having an end face at the periphery of the base, the end face of the output hole being beneath the rear side of the electronic device when the electronic device is oriented with the rear side beneath the front side, the end face of the output hole facing outwards laterally from the case;
wherein the speaker sound which is output from the speaker hole is amplified within the speaker sound path and is then output through the speaker sound output hole; and
wherein the electronic device and an upper surface of the base are in contact and the speaker sound path is formed from a gap between the electronic device and the protective case.

* * * * *